(12) United States Patent
Neyman et al.

(10) Patent No.: US 7,937,306 B2
(45) Date of Patent: May 3, 2011

(54) ARCHITECTURE FOR ANONYMOUS TRADING SYSTEM

(75) Inventors: Vladimir Neyman, West Orange, NJ (US); Edward R. Howorka, Morris Plains, NJ (US); Steven Iaccheo, Lincoln Park, NJ (US); Neena Jain, South Plainfield, NJ (US); James Shu, East Hanover, NJ (US)

(73) Assignee: EBS Group Limited, London (GB)

( * ) Notice: Subject to any disclaimer, the term of this patent is extended or adjusted under 35 U.S.C. 154(b) by 0 days.

(21) Appl. No.: 12/020,759

(22) Filed: Jan. 28, 2008

(65) Prior Publication Data

US 2008/0120377 A1  May 22, 2008

Related U.S. Application Data

(62) Division of application No. 09/602,498, filed on Jun. 23, 2000, now Pat. No. 7,366,690.

(51) Int. Cl.
*G06Q 40/00* (2006.01)
(52) U.S. Cl. .................................... 705/35; 705/37
(58) Field of Classification Search ............. 705/35–45
See application file for complete search history.

(56) References Cited

U.S. PATENT DOCUMENTS

| | | |
|---|---|---|
| 3,823,387 A | 7/1974 | McClellan |
| 4,388,489 A | 6/1983 | Wigan et al. |
| 4,525,779 A | 6/1985 | Davids et al. |
| 4,531,184 A | 7/1985 | Wigan et al. |
| 4,554,418 A | 11/1985 | Toy |
| 4,555,781 A | 11/1985 | Baldry et al. |
| 4,598,367 A | 7/1986 | DeFrancesco et al. |
| 4,623,964 A | 11/1986 | Getz et al. |
| 4,750,135 A | 6/1988 | Boilen |
| 4,815,030 A | 3/1989 | Cross et al. |
| 5,003,473 A | 3/1991 | Richards |
| 5,034,916 A | 7/1991 | Ordish |
| 5,077,665 A | 12/1991 | Silverman et al. |
| 5,195,031 A | 3/1993 | Ordish |
| 5,230,048 A | 7/1993 | Moy |
| 5,257,369 A | 10/1993 | Skeen et al. |
| 5,267,148 A | 11/1993 | Kosaka et al. |
| 5,270,922 A | 12/1993 | Higgins |
| 5,287,787 A | 2/1994 | Inoue |
| 5,508,913 A | 4/1996 | Yamamoto et al. |
| 5,557,780 A | 9/1996 | Edwards et al. |
| 5,557,798 A | 9/1996 | Skeen et al. |

(Continued)

FOREIGN PATENT DOCUMENTS

EP    0399850    11/1990

(Continued)

OTHER PUBLICATIONS

Mini Computer forum, Conference Proceedings, 1975.

(Continued)

*Primary Examiner* — Richard C Weisberger
(74) *Attorney, Agent, or Firm* — Dickstein Shapiro LLP

(57) ABSTRACT

An anonymous trading system comprises a network of broker nodes, each of which have an equal status and can match orders, initiate deals and distribute prices. Trading agents are connected to some or all of the broker nodes. The network is arranged to conform to a series of rules and in a preferred embodiment the brokers are arranged as a clique tree.

28 Claims, 8 Drawing Sheets

U.S. PATENT DOCUMENTS

| | | | |
|---|---|---|---|
| 5,600,638 | A | 2/1997 | Bertin et al. |
| 5,615,269 | A | 3/1997 | Micali |
| 5,710,889 | A | 1/1998 | Clark et al. |
| 5,727,165 | A | 3/1998 | Ordish et al. |
| 5,787,402 | A | 7/1998 | Potter et al. |
| 5,809,483 | A | 9/1998 | Broka et al. |
| 5,815,665 | A | 9/1998 | Teper et al. |
| 5,864,827 | A | 1/1999 | Wilson |
| 5,870,544 | A | 2/1999 | Curtis |
| 5,890,140 | A | 3/1999 | Clark et al. |
| 5,905,248 | A | 5/1999 | Russell et al. |
| 5,905,974 | A | 5/1999 | Fraser et al. |
| 5,909,545 | A | 6/1999 | Frese, II et al. |
| 5,915,209 | A | 6/1999 | Lawrence |
| 5,924,082 | A | 7/1999 | Silverman et al. |
| 5,924,083 | A | 7/1999 | Silverman et al. |
| 5,933,816 | A | 8/1999 | Zeanah et al. |
| 5,966,531 | A | 10/1999 | Skeen et al. |
| 5,995,947 | A | 11/1999 | Fraser et al. |
| 6,029,146 | A * | 2/2000 | Hawkins et al. ............... 705/35 |
| 6,519,574 | B1 | 2/2003 | Wilton et al. |
| 7,366,690 | B1 * | 4/2008 | Howorka et al. ............... 705/35 |

FOREIGN PATENT DOCUMENTS

| | | |
|---|---|---|
| EP | 0407026 | 1/1991 |
| EP | 0411748 | 2/1991 |
| EP | 0434224 | 6/1991 |
| EP | 0485252 | 5/1992 |
| EP | 0512702 | 11/1992 |
| EP | 0798635 | 10/1997 |
| EP | 0818746 | 1/1998 |
| EP | 0893758 | 1/1999 |
| EP | 0907134 | 4/1999 |
| FR | 2543327 | 9/1984 |
| GB | 1489574 | 10/1977 |
| GB | 2165421 | 4/1986 |
| GB | 2180380 | 3/1987 |
| GB | 2210714 | 6/1989 |
| GB | 2282246 | 3/1995 |
| GB | 2325130 | 11/1998 |
| GB | 2326256 | 12/1998 |
| JP | 7-212397 A | 8/1995 |
| JP | 10-511788 A | 11/1998 |
| WO | 90/02382 | 3/1990 |
| WO | 92/07324 | 4/1992 |
| WO | 92/15174 | 9/1992 |
| WO | 93/15467 | 8/1993 |
| WO | 94/15294 | 7/1994 |
| WO | 95/06918 | 3/1995 |
| WO | 95/18418 | 7/1995 |
| WO | 95/30211 | 11/1995 |
| WO | 96/18963 | 6/1996 |
| WO | 96/34357 | 10/1996 |
| WO | WO-96/41315 A1 | 12/1996 |
| WO | WO 97/08640 | 3/1997 |
| WO | 97/22072 | 6/1997 |
| WO | 97/24833 | 7/1997 |
| WO | 97/31323 | 8/1997 |
| WO | 97/33215 | 9/1997 |
| WO | 97/36253 | 10/1997 |
| WO | 97/43727 | 11/1997 |
| WO | 97/45802 | 12/1997 |
| WO | 97/49050 | 12/1997 |
| WO | 98/05011 | 2/1998 |
| WO | 98/13796 | 4/1998 |
| WO | 98/21667 | 5/1998 |
| WO | 98/24041 | 6/1998 |
| WO | 98/26344 | 6/1998 |
| WO | 98/26363 | 6/1998 |
| WO | 98/36456 | 8/1998 |
| WO | 98/38558 | 9/1998 |
| WO | 98/47268 | 10/1998 |
| WO | 98/49635 | 11/1998 |
| WO | 98/49639 | 11/1998 |
| WO | 98/53581 | 11/1998 |
| WO | 99/01983 | 1/1999 |
| WO | 99/08419 | 2/1999 |
| WO | 99/10795 | 3/1999 |
| WO | 99/10815 | 3/1999 |
| WO | 99/14695 | 3/1999 |
| WO | 99/19821 | 4/1999 |
| WO | 99/27477 | 6/1999 |
| WO | 99/33242 | 7/1999 |
| WO | 99/35583 | 7/1999 |
| WO | 99/36875 | 7/1999 |
| WO | 99/40502 | 8/1999 |
| WO | 99/41690 | 8/1999 |
| WO | 99/50771 | 10/1999 |

OTHER PUBLICATIONS

Wall Street Computer Review, 1998.
Computers in the City, Conference Proceedings, 1988.
Banking Technology, 1988, vol. 5, No. 5.
U.K. Search Report issued Feb. 9, 2001 (in English).
"Pathalias," Honeyman P. & Bellovin SM, Proc. USENIX Summer Conference, Jun. 1986, pp. 126-141.
"A Cluster-based Approach for Routing in Ad-Hoc networks," Krishna et al., May 11, 1995, at www.usenix.org/publications/library/proceedings/mob95/full papers/krishna.txt.
Australian Search Report dated Dec. 10, 2002.

* cited by examiner

ARCHITECTURE FOR ANONYMOUS TRADING SYSTEM

CROSS-REFERENCE TO RELATED APPLICATION

This is a division of application Ser. No. 09/602,498, filed Jun. 23, 2000, which is hereby incorporated herein by reference.

TECHNICAL FIELD

The present invention relates to a computer trading system for providing an electronic broking service for tradable items such as foreign exchange and financial instruments generally. In particular, the invention relates to a computer trading system having a plurality of trader terminals connected to a network for submission and matching of bids, offers, buy and sell orders.

BACKGROUND TO THE INVENTION

An anonymous trading system is known, for example, in EP-A-0,399,850, EP-A-0,406,026 and EP-A-0,411,748 which disclose an automated matching system for anonymous trading of foreign currencies (or other financial instruments). In this system, a single host computer maintains a central database of all trading instruments available for trade, credit information and bids and offers which have been submitted by terminals connected to the host via a computer network. The host computer uses information in its central database to match bids and offers and buy and sell orders based on matching criteria which include a counter party credit limit.

The counter party credit limits are set at each trading floor, and are stored at the host computer, which then establishes a gross counter party credit limit for each possible pair of counter-parties. The gross counter party credit limit is the minimum amount of the remaining credit from a first party to a second party, and the second party to the first party. The various trader terminals connected to the host computer maintain and display only a restricted subset of the information available at the host computer, such as best bids and offers.

A problem was identified with this system in that the host computer only used the credit information to check that a deal could proceed after a potential match had been identified. A trader thus could not know whether he had credit with a potential counter party prior to attempting to trade. This problem was identified and a solution provided in the system disclosed in U.S. Pat. No. 5,375,055.

In the system disclosed in U.S. Pat. No. 5,375,055 a credit matrix is derived and stored at a plurality of regional nodes of a distributed network, with each regional node distributing market information to a set of trader terminals to which the regional node is connected via an access node. The regional node is known as a Market Distributor and provides dealable price information to the trader terminals connected via the access node known as a Market Access Node. The actual matching of bids, offers, buy and sell commands is provided by separate nodes known as Arbitrators.

We have appreciated problems with both the first, host system and second, distributed system discussed above. In particular, we have appreciated that a computer trading system should be capable of handling message flow in a global environment in which traders may be on different continents. In the host system, messages between trader terminals must travel unnecessarily large distances to reach the single, host computer. This is particularly the case because deals may often fail because traders attempt to "hit" displayed prices which are derived from quotes submitted by traders with which they have no credit. In the second, distributed system the burden of message traffic is reduced by pre-screening prices for credit compatibility. However, messages must still flow between Arbitrator nodes and Market Distributor nodes so that the trader's view of an available market and the actual market available for matching are synchronised.

In view of the time taken for messages to pass through the system we have appreciated that it is desirable to move towards a more fully distributed system in which matching does not take place at a central location or at one of a small number of central locations. In such a distributed system message flow though the network becomes very important and it is essential to eliminate redundant traffic.

We have particularly appreciated the need for a streamlined message flow in a distributed system.

SUMMARY OF THE INVENTION

In a broad aspect, the invention provides a computer trading system in which nodes pass messages to one another in accordance with a set of rules to avoid duplication or information flow.

In particular, there is a provided a computer trading system for trading fungible instruments, comprising: a communication network for transmitting deal related information messages comprising deal related information; a plurality of order input devices connected to the network for generating price quotation messages comprising orders; and a plurality of nodes connected to the network in a distributed arrangement and arranged to distribute deal information messages throughout the network, message distribution between nodes being via canonical paths between nodes where a canonical path is the optimal route between a pair of nodes and wherein:
i. A canonical path between two given nodes is commutative;
ii. Where a canonical path between two given nodes includes one or more further nodes, the canonical path between the further nodes and each of the given nodes is the same as the sub-path between the given node and the further node that forms part of the canonical path between the given nodes; and
iii. The canonical path between each node and itself is empty.

Preferably, the nodes are arranged as a plurality of cliques, wherein each clique comprises a plurality of logically connected nodes, with each node in a clique being connected to all other nodes in the clique and any two cliques are connected by a single path, whereby the plurality of nodes form a clique tree.

The use of a clique tree provides an elegant network solution which agrees with the three conditions relating to canonical paths between nodes. A given node may be in two neighbouring cliques but a single path connects two cliques.

Preferably each of the nodes are brokers which perform the functions of order matching, deal execution and price distribution.

BRIEF DESCRIPTION OF THE DRAWINGS

An embodiment of the invention will now be described, by way of example only, and with reference to the accompanying figures in which.

DESCRIPTION OF A PREFERRED EMBODIMENT

Figure 1:
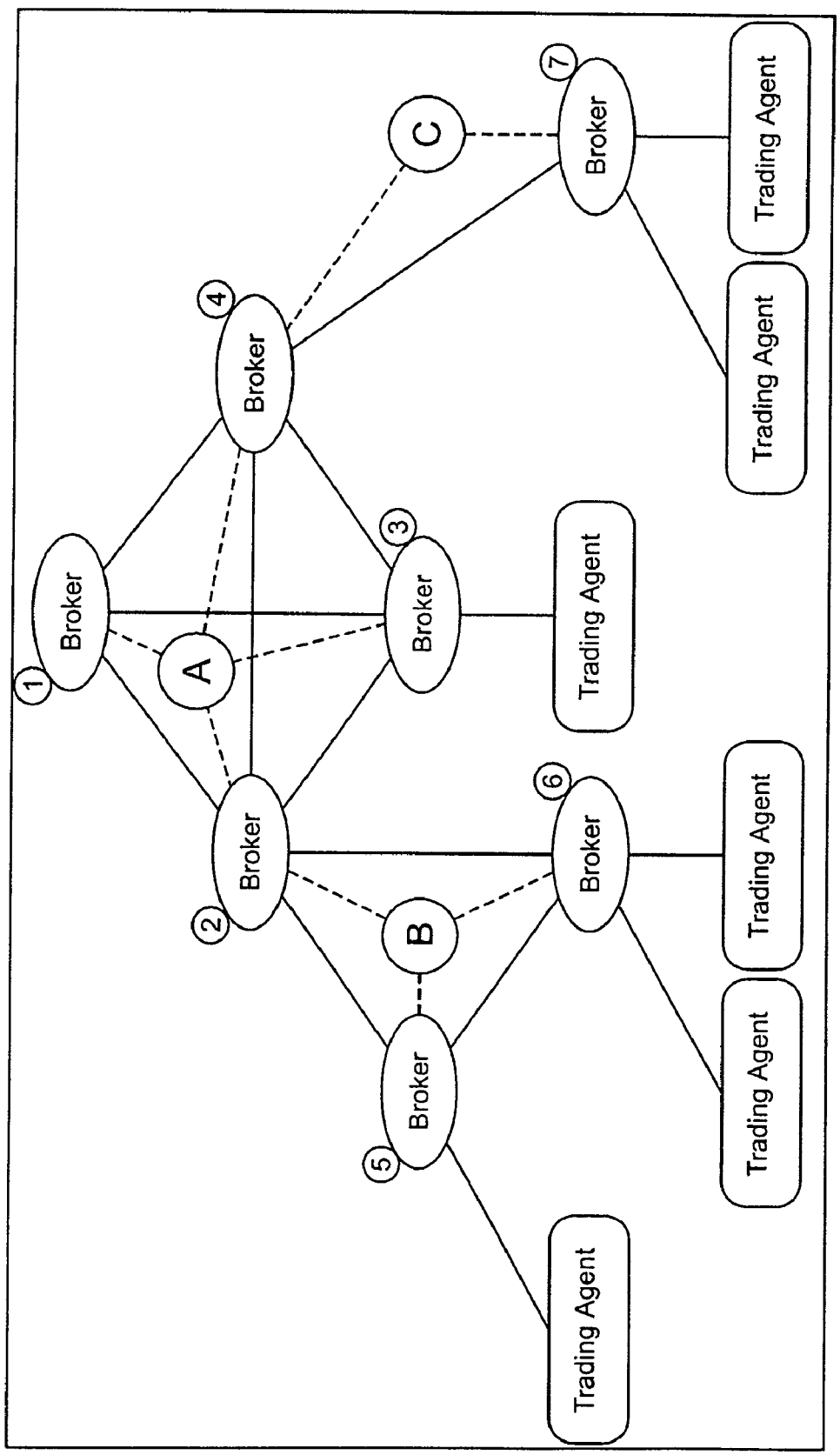
FIG. 1: is an overview of a trading system embodying the invention.

The purpose of the embodying system is to allow traders to enter quotes and orders which are then matched within the system. The system provides a platform for trading at at least the following instruments: FX Spot, FRA, and Forwards and also, FX Forwards, CFDs, short-dated government and/or central bank paper, commercial bills, CDs, inter-bank deposits, commercial paper, repos, interest-rate futures, swaps, options and a miscellany of tailor-made variants on these basic products. These are all referred to as financial instruments.

Traders at trader terminals submit quotes and hits which are then passed on to each of a plurality of broker nodes throughout the system. A quote is a bid or offer order submitted by a trader to "make a market" and is distributed to other traders as part of a market view.

Quotes are thus orders visible to other traders. A hit is a buy or sell order submitted by a trader wishing to create a deal on the basis of a price displayed on his market view derived from one or more quotes. Hits are orders which are invisible to other traders. The computer trading system of FIG. 1 comprises a plurality of trading agents 10 each connected to at least one of a plurality of broker nodes 12. Each trading agent is the means by which the trader terminals access the trading system, and is one embodiment of an order input device.

In the embodying system, each node is a Broker node having certain functionality described later. However, it is noted for the avoidance of doubt that the nodes need not all have the functionality of Broker nodes. One or more nodes could act as message distribution nodes.

Trader terminals (not shown) may be workstations or other computer terminals configured to submit quotes and orders (usually through use of a specialised key pad) and to display market view data, including price and amount available, for financial instruments to be traded. Traders are typically grouped as part of a financial institution, such as a bank, which arranges traders as part of a trading floor. A trading floor is a group of traders under common control of a trading floor administrator who allocates credit lines for the trading floor against other trading floors. The market view for a trader, or group of traders, is the market information (price, volume, etc.) That the traders can see that reflect the market. The market views are preferably pre-screened for credit compatibility.

The embodying system is preferably an anonymous trading system in which the market views produced by the brokers comprise price and amount information without identifying the source of the price. The prices displayed for available bids and offers and the amounts available at those prices, are thus aggregates of one or more quotes. Only the quotes of parties satisfying the pre-screen credit criteria are included in the aggregate price displayed. The market views produced by the broker nodes thus differ from one trading floor to another depending on the credit allocation.

The trading agent node provides services to a specific trading floor or group of traders. These services include providing access to the network for each trading work station, completing deals, producing deal tickets and maintaining historical dealing information for traders. Each trading agent node must connect to at least one broker node to access the trading system. A group of trader terminals thus connects to a trading agent 10 to access the system.

The clique tree described is one embodiment of a general principle which may be derived for designing a multi-broker trading system.

Starting from a set of broking nodes, with some links established between some of them, it can be seen that there is a graph, with the broking nodes being the vertices and the links being the edges of the graph. The graph is assumed to be connected, i.e. there should be a path between each pair of nodes.

The graph has an additional structure called "canonical paths". More exactly, for each pair of nodes A and B, one path between A and B is chosen and called a "canonical path". A canonical path may be described as representing presumably the best way to send messages. The message flow patterns to be described will always use canonical paths to route messages.

The canonical paths are then required to satisfy the following conditions:

(a) If $(A_1, A_2, \ldots, A_n)$ is the canonical path between $A_1$ and $A_n$, then $(A_n, \ldots, A_2, A_1)$ is the canonical path between $A_n$ and $A_1$.

(b) If $(A, \ldots, B, \ldots, C)$ is the canonical path between A and C, then its subpaths $(A, \ldots, B)$ and $(B, \ldots, C)$ are the canonical paths between (A and B) and (B and C) respectively.

(c) The canonical path between each node and itself is empty.
(This rule together with (b) guarantees that a canonical path can not contain loops).

Alternatively, canonical paths could be defined by defining first some metric on the links (e.g. link latency), and then define a canonical path as a path with minimal sum of links' metric values (in the example with latency, it would be a path with minimal total latency). Some care should be taken when there are several paths with the same minimal metric value: one must still choose, and this choice must be made consistently for all paths so that conditions (a) and (b) are satisfied.

The following discussion is not based on any particular way of defining canonical paths. It is sufficient to assume that they are defined, and that they satisfy above mentioned conditions (a), (b) and (c).

If nodes A and B are connected by a link, but this link is not the canonical path between A and B, then this link will never be used to send messages, as the canonical paths are always assumed to be the best way to send messages. Thus, it does not make sense to have links that are not canonical paths, and such links could be deleted from the graph without changing any message paths. The additional condition that each link should be a canonical path between the nodes that it connects was not included in the list of conditions relating to canonical paths, as there is no need to rely on this condition. However in practice this condition will probably be satisfied.

If one considers some node A, and then considers all canonical paths from A to all other nodes, and all links that are used in these canonical paths, it is easy to prove that these links form a tree. We will call this tree a tree generated by A, and denote it by Tree(A). All messages to or from A will always be sent through links belonging to this tree.

Thus, referring back to FIG. 1, it can now be seen that the logical architecture described is a clique tree and that the path between each node may be chosen to be a canonical path. The clique tree arrangement satisfies the three conditions of the canonical paths between nodes on the graph set out above.

Each Broker node 12 provides the basic order matching and price distribution services. The Broker nodes are arranged in a Clique Tree to enable faster communications routing, following very specific but simple rules. The Clique Tree is a network structure where individual nodes are grouped into Cliques, and the Cliques are then arranged into a tree structure. Each Broker can be linked logically to a number of Brokers, which are referred to as its neighbour Brokers. Communication between Brokers is on an equal level, with no "up" or "down" direction in the network.

While Trading Agents must be connected to at least one Broker node, they themselves are not members of the Clique Tree, but remain outside the structure. A Trading Agent connected to multiple Broker nodes will receive multiple sets of market prices. Even though the price information from different Broker nodes can be substantially the same, the information may be received at different intervals. A Trading Agent will send a given trading order to only one Broker node.

In the system illustrated in FIG. 1 there are three cliques, A, B and C. Clique B comprises three broker nodes labelled 2, 5 and 6; clique A comprises Four broker nodes labelled 1, 2, 3 and 4 and clique C comprises two broker nodes labelled 4 and 7. It will be seen that a broker node may belong to two cliques and broker node 2 is part of cliques A and B and broker node 4 is part of cliques A and C. It can easily be seen that the structure of FIG. 1 obeys rules (a), (b) and (c) relating to canonical paths set out above.

The cliques are arranged in a tree structure such that there is only one path between any two cliques and it will be seen that adjacent cliques must only have one node in common. Thus, nodes 2 and 4 are the unique common nodes between cliques A and B and A and C respectively.

As the broker nodes are arranged in cliques there is no concept of communication up or down the tree. A broker node has logical links with one or more neighbour broker nodes and communicates with each of those neighbour brokers on an equal basis. It is an important feature of the present system that a given broker node does not need to know about any broker nodes other than its neighbours. This enables broker nodes to be added to or removed from the system very easily. As a broker node is a member of one or more cliques it must know which of its own cliques a neighbour broker is a member of. Although a broker may be a member of more than one clique, it will only share one clique, it will only share one clique in common with a given neighbour broker.

The term Broker node is used to describe a computer arranged as a physical or logical node in a computer network providing a broking function. The basic broking function is the storing of quotes, providing the quotes to traders in the form of a market view and matching quotes and orders. The Broker nodes in the described embodiment also perform further functions, but these are not essential features of what is defined as a Broker node.

The Broker nodes are equal to each other, and perform the same functions. The arrangement of the network or their position in it is transparent to the broker nodes. They only need to know about their neighbours. Each Broker node has: knowledge of all orders in the market, and is able to match orders as soon as they are submitted. As a consequence of the fact that each Broker node maintains a full list of orders in the market, it is therefore able to customize market views as needed by the Trading Agents and is able to react faster to market information as soon as it is received.

The manner in which messages are exchanged between nodes will now be described. A unit of information exchange is a message. A message is always sent using one or a number or distribution patterns.

Each message must remember the following routing information:

(a) The distribution pattern with which the message was sent. Processing of the message on a receiving node will be different for targeted and for broadcast messages. However, if a simple pattern was invoked as a part of a composite distribution pattern, the processing on receiving nodes will not depend on the composite pattern, and information about the composite pattern need not be a part of messages. Moreover, the simple patterns "broadcast" and "broadcast with exclusion" have identical message processing on the receiving node as to all but the excluded nodes. Thus, a broadcast with exclusion message appears as a broadcast message the message only needs to remember whether it is a targeted or broadcast message.

(b) A node that was specified in the send request. For targeted messages it is the destination node, and for broadcast messages it is the root of the broadcast. This information is also needed on the receiving node in order to forward the message further when necessary.

(c) Each message must also contain one of three possible routing flags:

Bypass—meaning that the message is to be delivered only to the final destination(s).

Inspection—meaning that the message is to be delivered to each node on the path(s) from the source to the destination(s). The term "inspection" is used as the application on each of the intermediate nodes has an opportunity to inspect the message.

Interception—meaning that the message is in fact delivered only to the first node(s) on the path from the source to the destination(s). It is up to the application to re-send the message if it is to be delivered further. The application is not obligated to do so. A message sent with an Interception routing flag will not be delivered to its destination(s) if the application on one of the intermediate nodes chooses not to re-send it.

Algorithm Description

Each distribution pattern will describe a message processing algorithm on the sending node and (for simple patterns only) on the receiving node. The algorithm description will usually consist of a number of steps. It is assumed that for each message all steps of the algorithm must be executed in sequence, unless a certain step says "exit". "Exit" means that subsequent steps should not be executed for this message.

For example, the following simply algorithm sends message M to node D, unless D is the current node.

If D is the current node then exit.

Send message M to D.

Figure 2:
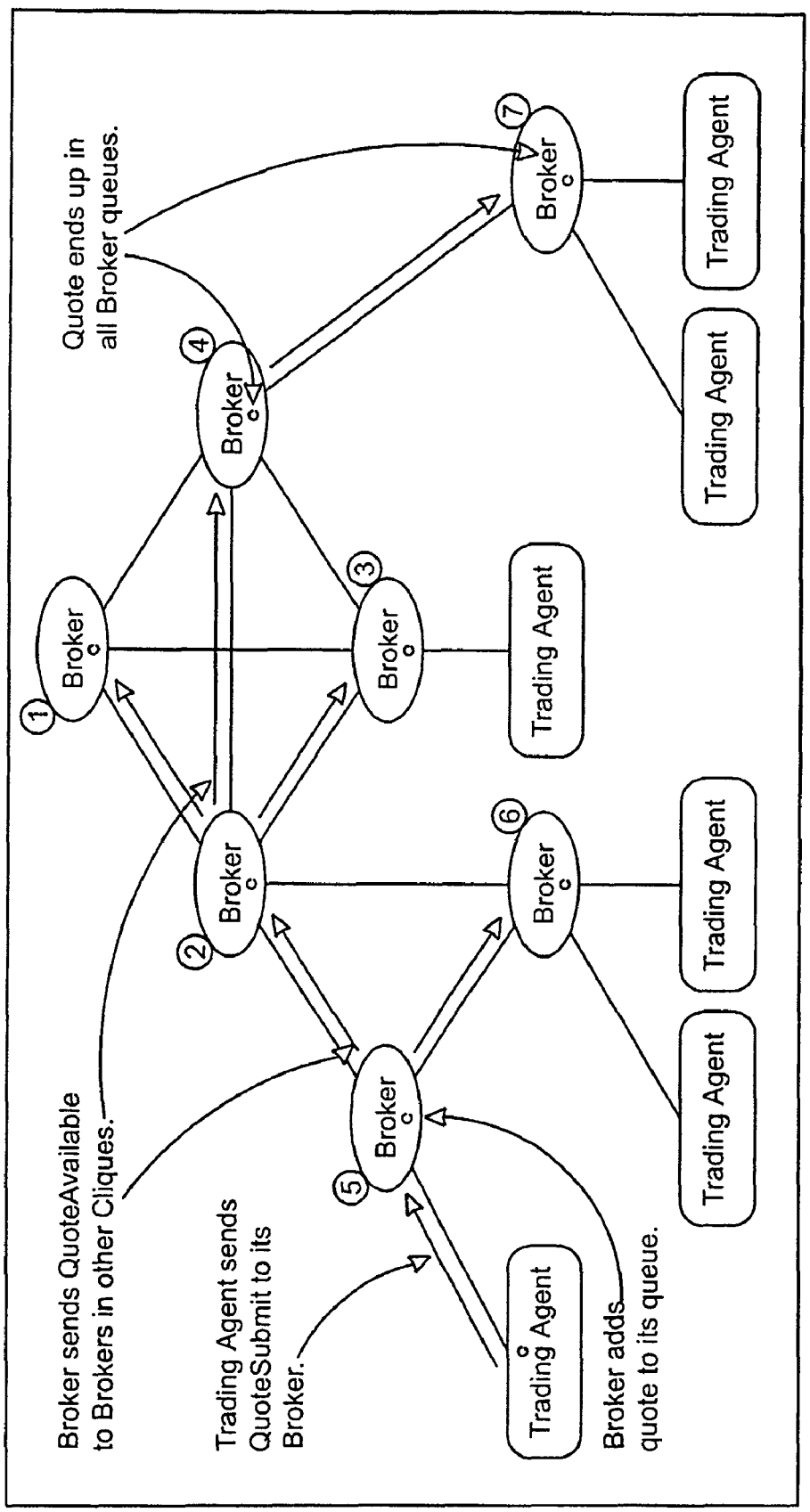
FIG. 2: shows the flow of messages when a new quote is submitted in the system.

To understand the purpose of the distributed broker node arrangement, price distribution and deal execution will now be described with reference to FIG. 2.

The deal process begins with one or more traders submitting orders into trader terminals. An order is a dealing request from a trader, with instructions to buy or sell with specific restrictions, such as price and amount. A quote is a persistent order that remains available in the system and is distributed as part of the market price information. Quotes are used to "make the market", and are known to traders as bids or offers.

A hit is an order that has the "invisible" and "fill or kill" properties. Hits are not distributed as part of the market price. A hit does not remain in the system; if it can not be dealt when entered, it is removed.

An Order Book is a list of all the available orders in the market. Since the Quotes are the only available orders, the book consists of a list of Quotes. The Quotes are arranged in a queue in the correct dealing order. The sort order of the queue may vary for different trading instruments. The default sort order is by price and time. In the system, each Broker node maintains a complete list of all available quotes.

The message flow in the system is described by named messages, each carrying appropriate parameters throughout the network. The process of submitting a quote (persistent order) begins when a Trading Agent receives information from a trader workstation that a trader has issued a bid or offer. The Trading Agent then starts the quote submission process. When the Trading Agent receives the quote information from the trader workstation, it will create and maintain a context for the quote. It will then send a Quote Submit message to the Broker node that it is connected to. The Broker node will validate the quote and accept it if valid. This first Broker node that receives the quote becomes the "owner" Broker node for this quote. In example shown in FIG. 2 this is Broker node 5. This is the only Broker node that can commit the quote to a deal. The Broker node will create a context or "quote object" and sort it into its queue for the correct tradable instrument.

After the quote is placed into its queue, the owner Broker node will then distribute the quote throughout the network by sending QuoteAvailable messages to other Broker nodes. In this example, Broker node 5 sends the QuoteAvailable message to Broker nodes 2 and 6. As each Broker node receives the message, it creates a context (quote object) and sorts it into its queue (order book). It notes in the context which Broker node had sent it the message. After placing it into the queue, the Broker node then sends the QuoteAvailable message on, using broadcast routing rules, to all neighbors in other cliques. Therefore, Broker node 2 sends it to 1, 3 and 4. Broker node 4 then sends it to Broker node 7. At this point, all Broker nodes know about the quote, and update their order books accordingly.

The message routing rules are applied to ensure that network traffic is handled in an efficient manner and to reduce any duplication of message flow. Simple and complex messaging patterns will now be described.

Simple Message Patterns
Targeted Distribution Pattern

Targeted distribution is used when a message needs be sent to a particular network node.
Usage:
  targetSend (M, D);
Parameters
  M is a message to be sent;
  D is a target node, i.e. the destination of the message.
Preconditions:
  D should be different from the sending node.
Action on the Sending Node:
  If A is the sending node and if (A, B, . . . , D) is the canonical path from A to D, B being the first node after A on this path; the action is to send M to B.
Actions on the Receiving Node:
  If this node is the message's destination, then deliver the message to the application and exit.
  If the message has an interception flag, then deliver the message to the application and exit.
  If the message has Inspection flag, then deliver the message to the application.
  Execute targetSend (M, D).

It can be seen that the message will be sent to the final destination by the canonical path from the source to the destination. In order to implement this pattern, the sending node must know the first link on the canonical path to the destination. For efficient implementation of this functionality, the sending node keeps a table that maps each potential destination node into one of the neighbours of the sending node, which is the first on the canonical path to this destination.

Broadcast Distribution Pattern

The broadcast distribution pattern is used when a message needs to be distributed to all nodes in the network. It can also be used to distribute the message to certain subsets of the nodes.
Usage:
  broadcast (M, R);
Parameters:
  M is a message to be sent;
  R is the root of the broadcast. The message will be sent on the links belonging to Tree(R).
Preconditions:
  None.
Actions on the Sending Node:
  If A is the sending node, the action is to send M to all such nodes N that both of the following conditions are satisfied:
  N is a neighbour of A;
  The canonical path from N to R starts with the link (N, A).
Actions on Receiving Nodes:
  Deliver the message to the application.
  If the message has Interception flag, then exit.
  Execute broadcast (M, R).

For broadcast distribution there is no explicitly specified destination, and the message is always delivered to all nodes that it reaches. Therefore, a Bypass routing flag should not be used for broadcast distribution. The Interception flag is allowed for broadcast messages. A message sent with Interception routing flag will not necessarily reach all nodes that a message sent with Inspection routing flag would reach. In order to implement this pattern, the sending node A must know the list of all of its neighbours that have the node A on canonical path to node R. It is preferred that a table is kept that maps nodes (R) into the list of such neighbours (N) of A that canonical path from N to R starts with the link (N, A).

In many cases, R will be the originator of the information. However, this is not a requirement, and broadcast (M, R) may be used for information not originated on R. If broadcast (M, R) is executed on R and the message has an Inspection routing flag, then the message will be delivered to all nodes in the network, and it will be delivered to each node only once. If broadcast (M, R) is executed on a node A different from R, then the broadcast will reach only a certain subtree in Tree(R). More exactly, it is the subtree with "subroot" A in Tree(R) that if it consists of all nodes B such that the A belongs to the path from B to R in Tree(R). The message will still be delivered to each node only once.

Broadcast with Exclusion Distribution Pattern

The Broadcast With Exclusion distribution pattern is used when some messages needs to be distributed to all nodes in the network, except a certain subtree in Tree (R).

Usage:
   broadcast (M, R, S);
Parameters:
   M is a message to be sent;
   R is the root of the broadcast. The message will be sent on the links belonging to Tree(R); and
   S is the node that specifies the direction where broadcast should not be sent, or null.
Preconditions:
   S should be a node different from the sending node, or S should be null.
Actions on the Sending Node:
   If A is the sending node, the action is to send M to all such nodes that all of the following conditions are true:
   N should be a neighbour of A;
   The canonical path from N to R starts with the link (N, A).
   If S is not null, the canonical path from A to S does not start with the link (A, N);
Actions on the Receiving Node:
   Deliver the message to the application.
   If the message has Interception flag, then exit.
   Execute broadcast (M, R).

Broadcast distribution pattern is a particular case of the broadcast with exclusion distribution pattern. In other words, broadcast (M, R) is equivalent to broadcast (M, R, null). Thus, the comments made with respect to the broadcast pattern are also true or the broadcast with exclusion pattern with the exception of the comment regarding the part of the network the broadcast would reach.

Broadcast with exclusion may only be different from broadcast on the first leg. For subsequent legs, broadcast with exclusion uses the normal broadcast pattern. There is no need to include in the message information whether the message was sent with broadcast or broadcast with exclusion patterns, as the processing on the receiving node in both cases is identical. The message broadcast (M, R, S) is different from broadcast (M,R) only if A (the sending node) belongs to the canonical path from S to R. Otherwise, broadcast (M, R, S) would be identical to broadcast (M, R), because even broadcast without exclusion would not send the message toward S if A is not on the canonical path from S to R.

Composite Message Patterns

Some Composite Message Patterns will now be described.

Composite patterns describe simultaneous distribution or several messages, each of them distributed according to one of the simple patterns described above. Composite patterns allow more precise and informative description of distribution messages. For example, ProposeDeal message by itself follows target distribution pattern. However, it also always generates MarketUpdate broadcasts. An existence of a composite pattern "Targeted distributions with Broadcast" allows us to describe ProposeDeal message as following this pattern, which captures not only the flow of ProposeDeal message, but also the flow of the generated broadcast message.

The description of composite patterns contains the same elements as the description simple patterns, except the actions on the receiving nodes. This is because messages do not keep information about composite patterns they were sent with; no special composite-pattern-related processing might happen on receiving nodes. All receiving-node processing is determined by sample distribution pattern of each message.

Processing on the sending node for a composite pattern always involves several simple distribution pattern invocations. Although in the description of the processing they will be invoked in certain order, this order is really immaterial, and invocations of simple patterns may occur concurrently.

Targeted Distribution with Broadcast Toward Root Pattern

Figure 7:
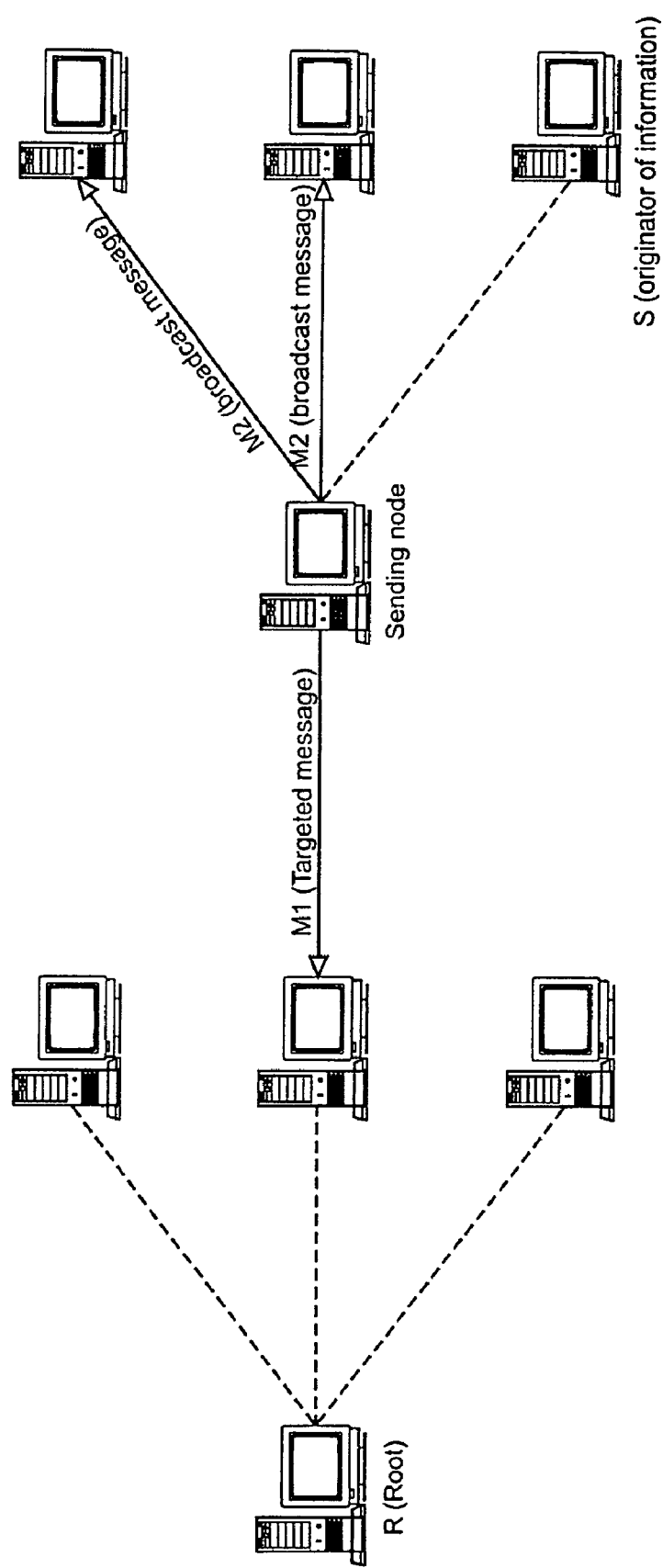
FIG. 7: shows the targeted distribution with broadcast towards root complex message pattern.

The Targeted Distribution With Broadcast Toward Root Pattern is used with a targeted information also generates a side broadcast. The targeted message is sent to the root, that is toward the node R that is the root of broadcast. This pattern is a combination of Targeted and Broadcast with Exclusion distribution patterns.
Usage:
   TargetAndBroadcastToRoot ($M_1$, $M_2$, R, S);
Parameters:
   M is the message to be sent with the targeted distribution pattern;
   M is the message to be sent with the broadcast distribution pattern;
   R is the root of the broadcast and destination of the targeted message. The targeted message will be sent to R (thus the name "toward root"), and broadcast messages will be sent on the links belonging to (R).
   S is the node that does not need this broadcast (usually because it was the originator of this information, or it was on the path that this information already travelled on), or null.
Preconditions:
   R should be different from the sending node.
   S should be a node different from the sending node, or it could be null. If S is not null, then the sending node should be on canonical path from S to R.
Actions on the Sending Node:
   Execute targetSend ($M_1$, R);
   Execute broadcast ($M_2$, R, S);

Targeted distribution with broadcast towards root pattern is illustrated in FIG. 7.

Normally, the message $M_2$ will contain the same information as message $M_1$, (or a subset of it), and passing it as a separate parameter may be considered superfluous. However, the particulars producing message $M_2$ from message $M_1$ are outside the scope of message distribution layer responsibilities, and is advisable to pass message $M_2$ to this layer explicitly.

In this pattern, broadcast on Tree(R) is used, the broadcast works as if it had originated on the node R. In this case, however, the information does not originate on R, on the contrary, it is sent towards R. However, the distribution pattern required for a side broadcast in this case coincides with broadcasts that originate on R, although because it did not originate on R, it would not reach all notes—in particular, it would not reach the nodes where the targeted message is sent.

Broadcast message $M_2$ may be sent with any routing flag, Inspection would be most typical, as is always the case with broadcast messages. However, targeted message $M_1$ would almost always be sent with Interception flag. The reason is that the distribution layer by itself can send message $M_1$ further to R, but it cannot recreate message M from message $M_1$ for broadcast. An application logic intervention is required in order to recreate message $M_2$ on the node that received message $M_1$.

Targeted Distribution with Broadcast from Root Pattern

Targeted Distribution With Broadcast from Root Pattern is used when a targeted information also generates a side broadcast. Broadcast usually needs to be distributed to all nodes that do not receive targeted message. The targeted message is sent in the direction opposite from the root of broadcast. This pattern is a combination of Targeted and Broadcast with Exclusion distribution patterns.

Figure 8:
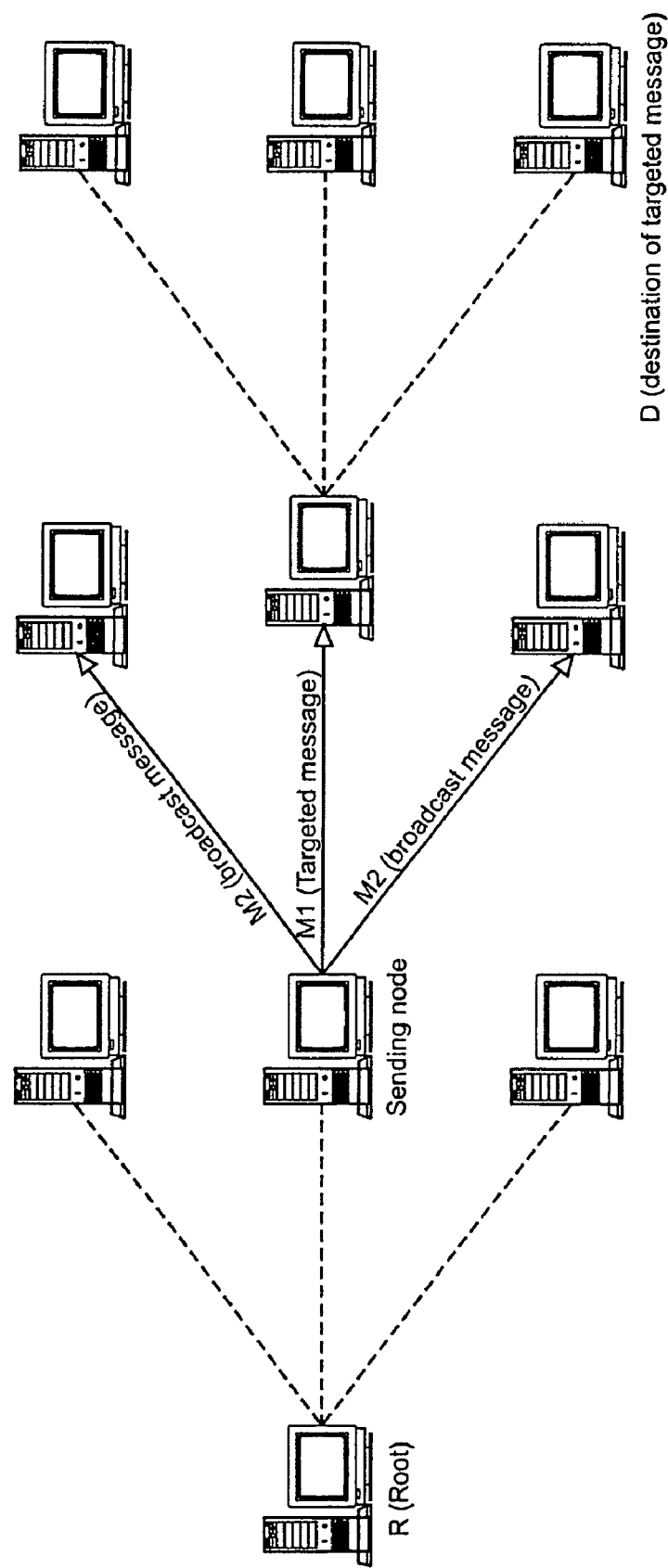
FIG. 8: shows the targeted distribution with broadcast from root complex message pattern.

Usage:
  TargetAndBroadcastFromRoot ($M_1$, $M_2$, R, D);
Parameters
  $M_1$ is the message to be sent with the targeted distribution pattern;
  $M_2$ is the message to be sent with the broadcast distribution pattern;
  R is the root of the broadcast. All messages will be sent on the links belonging to Tree(R).
  D is the destination of the targeted message.
Preconditions:
  D should be different from the sending node.
  Sending node should be on the canonical path from R to D.
Actions on the Sending Node:
  Execute targetSend ($M_1$, D);
  Execute broadcast ($M_2$, R, D);

The targeted distribution with broadcast from root pattern is shown in FIG. 8.

Normally, the message $M_2$ will contain the same information as message $M_1$, (or a subset of it), and passing it as a separate parameter may be considered superfluous. However, the particulars producing message $M_2$ from message $M_1$ are outside the scope of message distribution layer responsibilities, and is advisable to pass message $M_2$ to this layer explicitly.

Message $M_2$ is not to be sent to the same node as message $M_1$ is sent. There is no need to take any special actions to achieve this goal as broadcast naturally does not send messages toward the root of the broadcast, but only in the opposite direction. Broadcast message $M_2$ may be sent with any routing flag, Inspection would be most typical, as is always the case with broadcast messages. However, targeted message $M_1$ would almost always be sent with Interception flag. The reason is that the distribution layer by itself can send message $M_1$ further to R, but it cannot recreate message $M_2$ from message $M_1$ for broadcast. An application logic intervention is required in order to recreate message $M_2$ on the node that received message $M_1$.

In this pattern, the targeted message is sent in the direction opposition to the root of the tree, i.e. in the same direction where tree broadcast is normally sent. So, in order to avoid sending the broadcast message to the same node as targeted message is sent, a Broadcast with Exclusion pattern must be used. There is no need explicitly to exclude the originator of the information from the broadcast, because in this pattern the originator of information is located closer to the root than the sending node, and broadcast naturally does not send messages toward the root.

Figure 3:
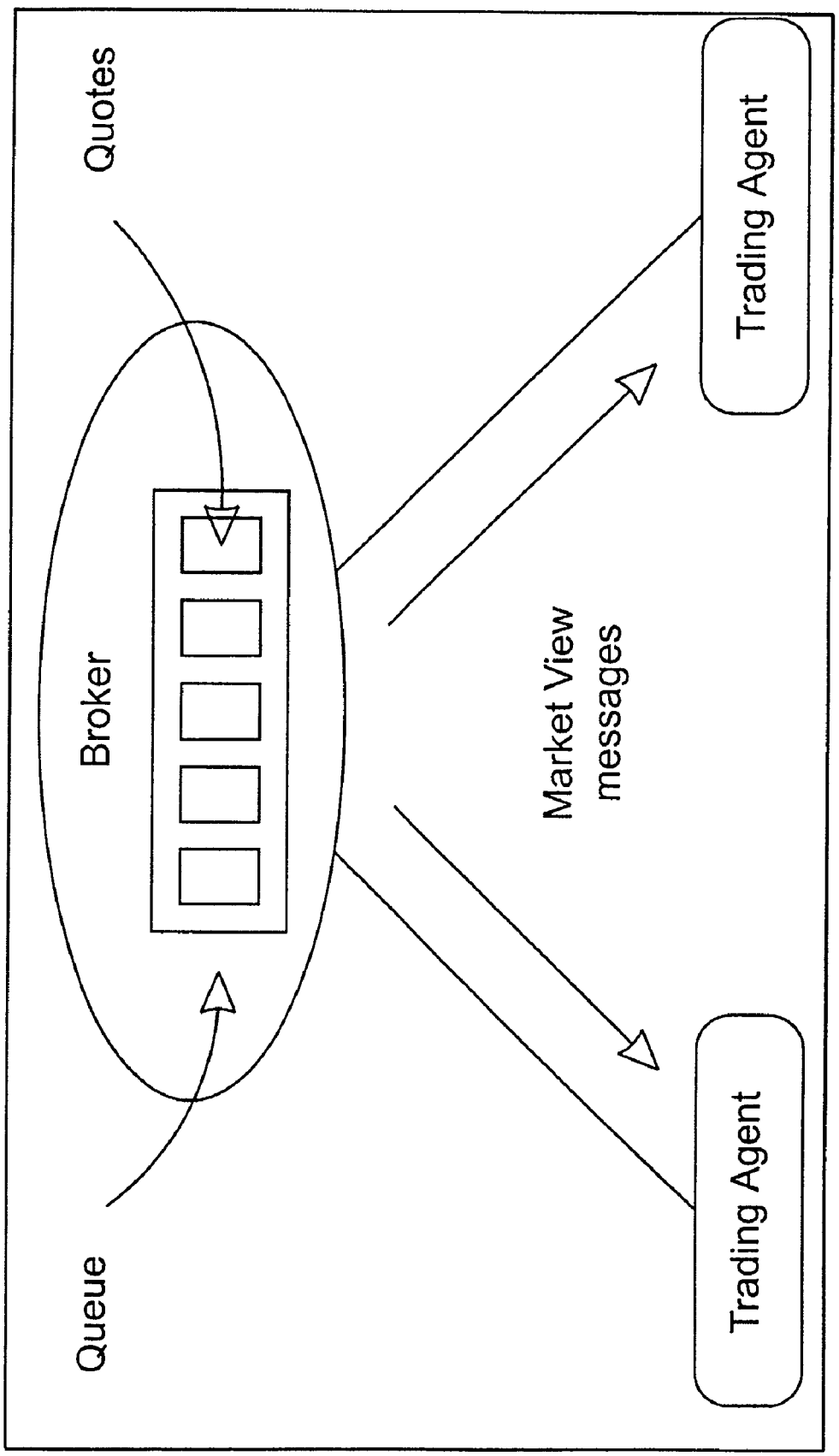
FIG. 3: depicts the production of a market view to traders.

Price distribution is the process of providing market information to the traders at the trader terminals. This information is created by the Brokers nodes and sent to the Trading Agents for distribution to the traders. This process is shown in FIG. 3.

Each Broker node will examine its queue of quotes (order book) and calculate a view of the market for each Trading Agent connected to it. This view is built specifically for the trading floor that the agent represents. Views may be different based on credit or other factors. The exact process for determining a market view will vary based on the trading instrument. The view information is sent to the Trading Agent in a MarketView message.

Figure 4:
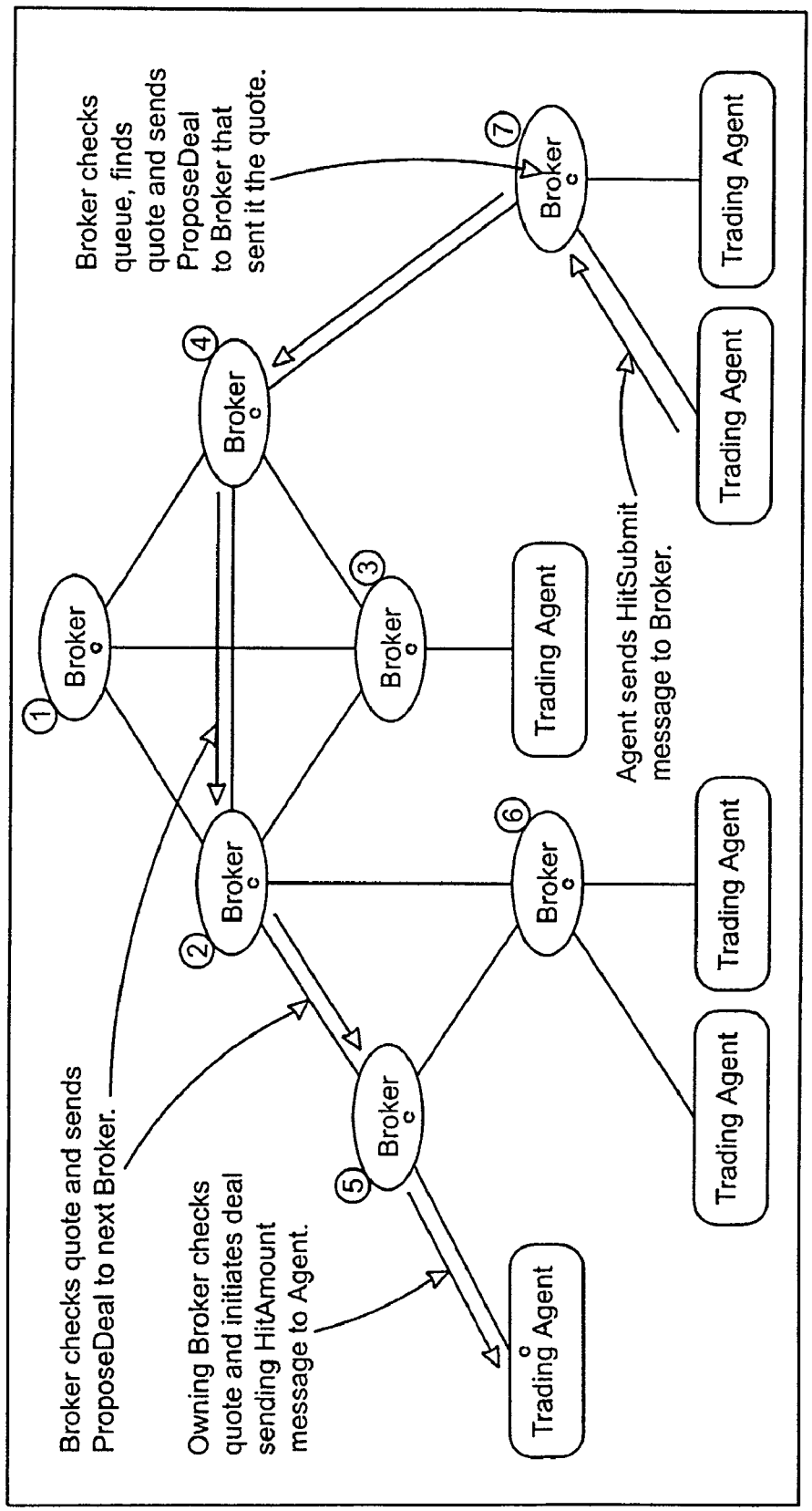
FIG. 4: shows the flow of messages when a trader submits a buy or sell order.

Hitting a quote is the basic process of creating a deal between two traders. A hit from one trader is matched to a quote from another trader. This process is shown in the FIG. 4. The Trading Agent of the trader terminal hitting a price shown on his market view display sends a HitSubmit message to the Broker node. This message targets a price, not a specific quote. The Broker node will scan its queue and find the first quote in the queue that can be matched with the hit. The matching rules may vary based on the trading instrument.

When the hit is matched to a quote, the Broker node will modify its context for the quote, moving the amount matched from "available" to "reserved pending deal". This will prevent the same amount of the quote to be matched with another hit. The Broker node will then send a ProposeDeal message to the Broker node from which it received the quote. This message will target the specific quote. In this example, Broker 7 will sent the message to Broker 4.

As each Broker node receives the ProposeDeal message, it checks the quote in its queue. If the amount of the proposed deal is still available in the queue, the Broker node performs a similar process as the matching Broker node. The amount of the proposed deal is moved from "available" to "reserved pending deal". The ProposeDeal message is then sent to the Broker node from which it received the quote. In the example, Broker node 4 sends to Broker node 2. Broker node 2 will then send it to Broker node 5.

The routing of a ProposeDeal message follows the targeted routing rules. Targeted routing is used to deliver information to a specific Broker node. Since knowledge or specific Broker nodes is not built into the system, the target is not a specific Broker node, but is the Broker node from which the information originated. For example, a message is not sent to "Broker node 714", but is sent as to "the Broker node originating quote 42".

The message will thus follow the path of the original information back to its source. In the example this is from Broker node 7, to Broker node 5, via Broker nodes 2 and 4 direct.

When the Broker node that originally created the quote receives the ProposeDeal message, it performs the same checks and amount reservation as the other brokers. Since this Broker node owns the quote, it has the authority to commit the quote to a deal. The ProposeDeal message represents the authority to commit the hit to the deal. The Broker node will then initiate the deal process by sending a HitAmount message to the Trading Agent that submitted the quote. The deal execution process is described later.

Figure 5:
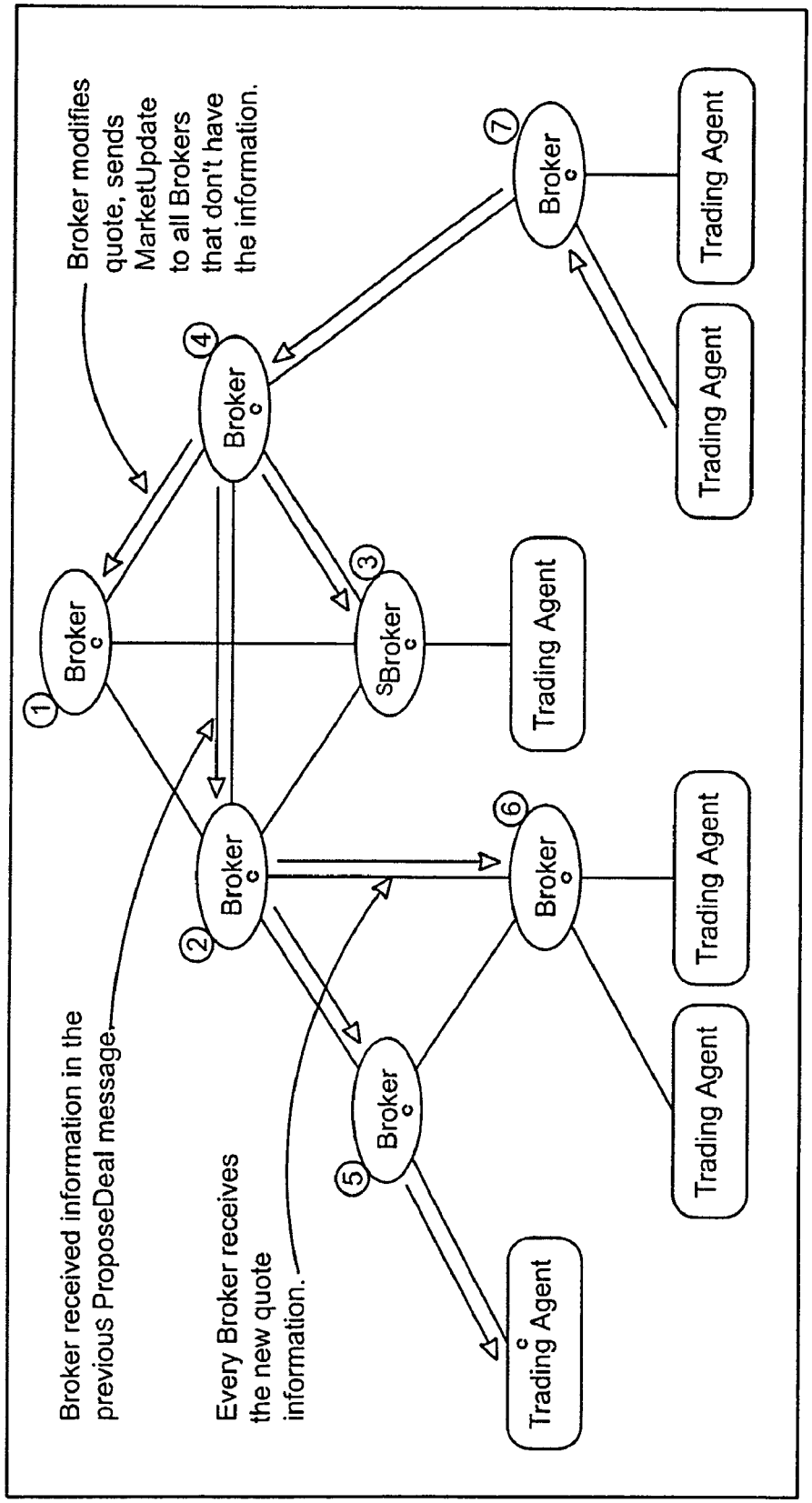
FIG. 5: shows the flow of messages to update broker nodes following a buy or sell order.

As the deal matching process takes place, it is necessary that the list of quotes maintained at each Broker node be keep up to date. This is accomplished by each Broker node notifying others when it makes a change to a quote, as shown in FIG. 5.

As each Broker node changes a quote in its queue, it notifies all neighbor Broker nodes except those in the clique from which it received the change. In the example above, Broker node 4 received notice of a change in a quote from Broker node 7 in a ProposeDeal message. It notifies Broker node 2 by sending the ProposeDeal message. Broker node 4 must now notify Broker nodes 1 and 3. This is done by sending a MarketUpdate message to these Broker nodes.

Following the normal routing rules, the information about the quote is distributed to each Broker node in the network. Any Broker node receiving the MarketUpdate message will pass it to all neighbors not in the clique from which it is received. Note that a Broker node sending a ProposeDeal message should not also send a MarketUpdate message to the same Broker node. This would result in duplicate information being received and the deal amount being reserved twice.

Figure 6:
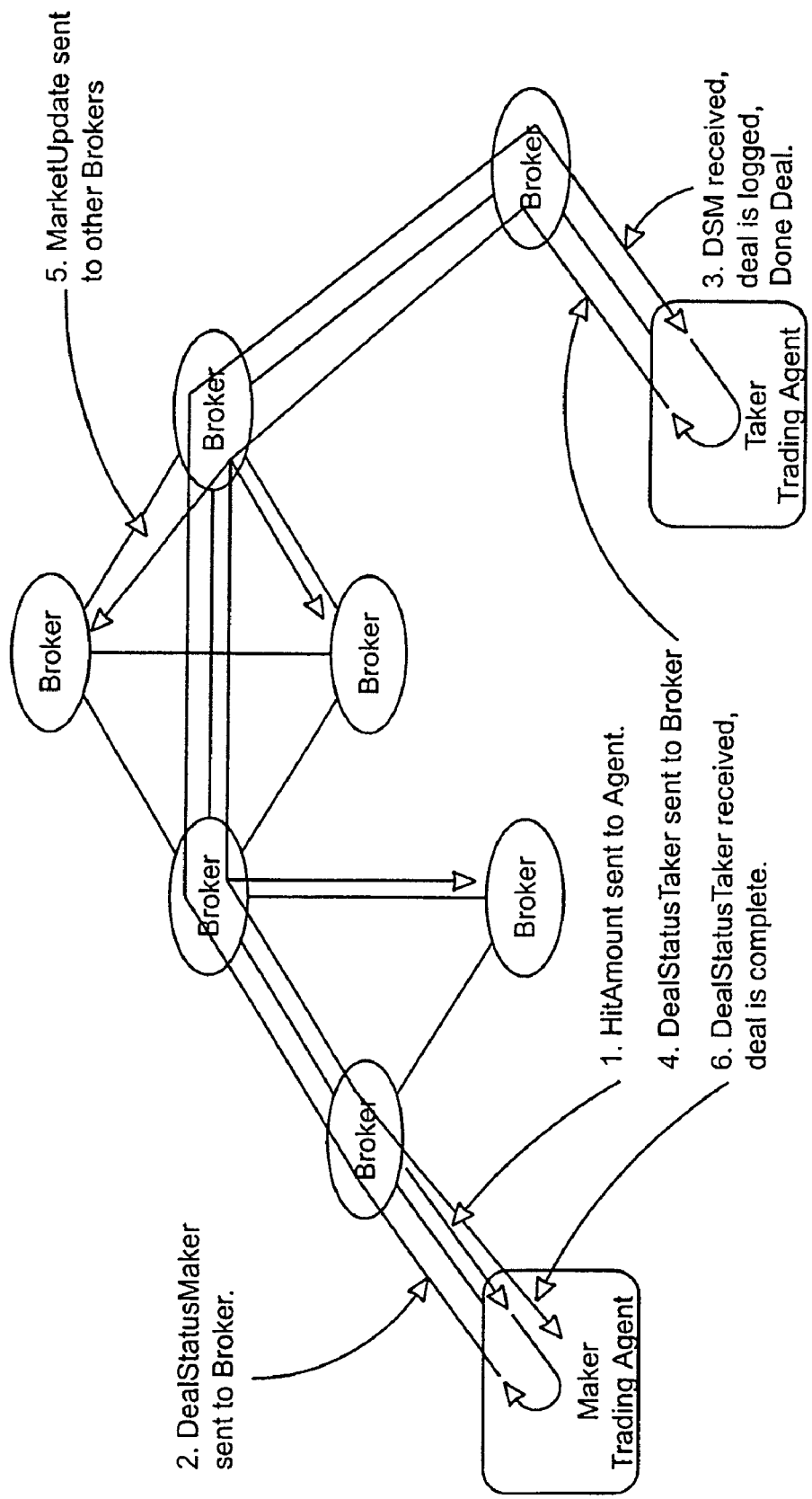
FIG. 6: shows the deal execution process.

The deal execution process itself is not central to the present invention, but will now be described for completeness. When the deal matching process is completed, as described above, the deal execution process begins. This process completes the deal and commits the traders to a deal. The process is shown in FIG. 6. As matches are made and deals initiated, information is made available for traders. This information can be used to inform a trader that a deal is pending. Any given trading application can decide if the trader should be informed. In any case, the information is available.

The Taker's Trading Agent will be notified as soon as the initial match is made and the ProposeDeal message is sent. This agent can notify the traders workstation at this time. This pending deal information may change as the matching process continues. The maker workstation is notified or the pending deal when the maker's Trading Agent checks credit and sends the DealStatusMaker message.

The deal execution process begins when the maker's Trading Agent receives a HitAmount message from its Broker node. This message informs the Agent that a match was made for one of its quotes. The message identifies the quote as well as the amount of the hit, counterparty and the identity of the hit. The Agent will check with the trader workstation to make sure that the quote is still available. The Agent will send a HitAmountWS message to the workstation. The workstation will reply with a HitAmountWK message to show that the workstation is still working and that the trader did not interrupt the quote. At this point, the trader can no longer interrupt the deal.

The Trading Agent will next check for available credit with the counterparty. The credit check may allow the deal, reduce the amount of the deal or disallow the deal. The Agent will then reduce the available credit by the amount needed for the deal. This reduction in available credit may affect future deals. The maker's Trading Agent will now inform the taker's Trading Agent of the deal by sending a DealStatusMaker message to its Broker node. The message is targeted to the identity of the hit. The network Broker nodes will route the message to the owner Broker node of the hit, and that Broker node will deliver it to the taker's Agent. Once this message is sent, the maker's Agent knows that a deal may have been done, but the deal is in doubt pending a reply. The taker's Trading Agent completes the deal execution process. This part or the process takes place when the Agent receives the DealStatusMaker message from the maker. If the message shows a valid deal, the process continues.

The taker's Trading Agent will next check for available credit with the counterparty in a similar manner as the maker. The credit check may allow the deal, reduce the amount of the deal or disallow the deal. The Agent will then reduce the available credit by the amount needed for the deal. This reduction in available credit may affect future deals. The taker's Trading Agent will now log the deal to its disk. As soon as the information is committed to persistent storage, the deal is done. Any checks on the deal status will now show a binding deal. The agent will now notify the trader, print a deal ticket and perform any other post deal processing. At this point, the deal is done but the maker doesn't know yet. As soon as the deal is done, the taker's Trading Agent will notify the maker by sending a DealStatusTaker message to its Broker node. This message targeted to the quote and will be routed to the maker's Agent.

The DealStatusTaker message contains final information about the deal, and therefore the final changes to the quote. This information is used by the network Broker nodes and the Trading Agent. As the DealStatusTaker message is routed through the Broker nodes, each routing Broker node will use the information to update its quote context. The amount of the deal is moved from "reserved" to "complete". The portion not done is moved from "reserved" to "available" if the quote is still active. It will then notify other Broker nodes of the changes and of the deal by sending a MarketUpdate message to all other Broker nodes using network routing rules.

When the DealStatusTaker message gets to the owner Broker node of the quote, it will send it to the Trading Agent. The Agent will record the deal to disk. At this point the deal is no longer in doubt. The Agent will notify the trader, print a ticket and perform any other processing that is required. Some trading instruments may require additional information to be exchanged for a deal. An example of this is the settlement instructions for EBS spot F/X. This type of information is sent in a DealInformation message. After the deal is processed, the Agents can develop this information. The dealInformation message is sent to the Broker node. The network Broker nodes will then route the message to the other Agent where the information is processed as required by the instrument. A deal is thus completed.

In the architecture described, a clique tree configuration of brokers is used in which each of the brokers have equal status. Trader agents are attached to some or all of the brokers. The brokers are arranged in cliques but trader agents are not. The clique arrangement, together with the rules for broadcast of messages and targeting of messages through the network minimises the message flow and ensures the quickest passage of message through the network. The message broadcast and targeting rules are such that the brokers do not have to know of the existence of all other brokers on the network, but rely on knowledge of where the message has come from and where it is to be sent to next. This means that alteration of the network to add or remove brokers is a relatively straightforward task.

In the foregoing description, reference has been made to various messages sent through the system by one of a number of message delivering methods.

The following describes messages which may be used within the context of the anonymous trading system described. The following discussion is not an exhaustive list but covers the main messages passed between the broker nodes. It does not include broker-trader messages. Each message is described in terms of a description, message attributes, the message distribution pattern, and preconditions which attach to the message, message processing and outgoing messages.

Order Submission and Cancelling

SubmitOrder and OrderAvailable Messages

Description

The SubmitOrder message is sent from a trader workstation to a broker when the trader enters a new order. This can be a visible order (quote) or invisible order (hit.) If this is a quote, then as a result of this event the broker broadcasts OrderAvailable messages to all other brokers. The broker who received the SubmitOrder message from a trader workstation is called the owner of the order.

Message Attributes

New order.

Distribution Pattern

SubmitOrder: Targeted distribution pattern. Routing flag does not matter but Interception flag is preferred.

OrderAvailable: Broadcast distribution pattern. Interception routing flag is used.

Preconditions

SubmitOrder: Message originator should be a trader workstation, and destination should be a broker directly connected with this workstation.

OrderAvailability: None.

Message Processing

As part of the processing of the SubmitOrder or OrderAvailable message, receiving broker B should do at least the following:

Memorize the new order.

Attempt to match the order, subject to certain conditions. Matching conditions (that are in addition to all business matching rules) are designed to prevent a possibility for the same proposed deal to originate on more than one broker, the danger being that two brokers would propose the same automatch. They may specify that broker B may match the new order N with an existing order O if at least one of the following is true:

Either N or O is a hit owned by B;

O is an offer owned by B;

N arrived via SubmitOrder message (i.e directly from the trader's workstation).

If the new order is a quote then send it to other brokers (possible with modified available and reserved amounts of some matching was done) of via OrderAvailable message.

Outgoing Messages

If B is the broker that is processing SubmitOrder or OrderAvailable message M, the following outgoing messages may be sent by B as a result of processing message M.

1. If the new order is a quote and broker B automatches it with an existing quote, then one of the quotes must be converted into the hit, or a partial hit if it is not matched for its full amount. The broker may convert to a hit only a quote that it owns. Depending on business rules for the instrument in question, such a conversion may require quote verification with the workstation. If this is the case, then a ConfirmOrder message must be sent to the workstation. If it is the workstation that submitted the quote, and $M_1$ is the new ConfirmOrder message. In the case, TargetSend ($M_1$, W); is executed.

2. If broker B has to convert a quote that he owns into a hit or a partial hit, it is not the newly submitted order, and business rules do not require quote verification as described above, then a MarketUpdate message needs to be broadcasted. The purpose of this message is to reserve the amount of the quote that is being converted into the hit. More exactly, let $M_1$ be the new MarketUpdate message. In this case broadcast ($M_1$, B); is executed.

3. In the case described in (2), a ProposeDeal message should also be sent to the owner of the other quote (not converted to the hit), unless B owns both quotes. More exactly, if R is the broker who is the owner of the other quote, and $M_1$ is the new ProposeDeal message, and $M_1$ is the MarketUpdate message generated by $M_1$.

In this case,

TargetAndBroadcasttoRoot ($M_1$ $M_2$, R, null); is executed.

4. If broker B matches the new order with an existing order, and both orders are owned by B, the ConfirmOrder and MarketUpdate message may have to be sent for one or both quotes. They are sent as described in (1) and (2).

5. If the new order is a quote, broker B has to send information about the new quote to other brokers (possibly in a modified form if he has performed some matches; this would transfer some available amount into a reserved amount). If $M_1$ is the OrderAvailable message that needs to be sent further, broadcast ($M_1$, B); is executed.

OrderCancelled and InterruptOrder Messages

Description

InterruptOrder message is sent from a trader workstation to a broker when the trader wishes to interrupt his order. As a result of this event, the broker broadcasts OrderCancelled message to all other brokers.

Message Attributes

Reference to a quote.

Distribution Pattern

InterruptOrder: Targeted distribution pattern. Routing flag does not matter but for consistency it is preferred to use Interception flag.

OrderCancelled: Broadcast distribution pattern. Inspection routing flag is used.

Preconditions

InterruptOrder: Message originator should be a trader workstation, and destination should be a broker directly connected with this workstation. InterruptOrder message may be sent from workstation W to broker B only if previously a SubmitOrder message was sent from W to B.

OrderCancelled: An OrderCancelled message may be sent (broadcasted) from Broker B only if previously a OrderAvailable message for the same order was broadcast from B.

Message Processing

As part of the processing of the OrderCancelled or InterruptOrder message, receiving broker B should do at least the following:

Verify that this order is known, and report an error otherwise;

Mark the order as canceled, prohibiting any new deals involving this order;

If there are no pending deals involving this order known to B and no outstanding ConfirmOrder requests, the latter being possible for the order owner only, the information about this quote need not be kept any longer.

Outgoing Messages

None

Unlike the previously described messages, the OrderCanceled message uses an inspection routing flag. Therefore it is not the application's responsibility to explicitly re-send this message further. The distribution layer will deliver this message to all brokers who need it.

Deal Proposal and Market Updates

ProposeDeal Messages

Informal Description

A ProposeDeal message is sent from the broker who initiated the match to the broker who owns the quote. A proposed deal always matches one quote (maker) and one hit (taker). The hit may be a quote converted to a hit during automatch, but it is still treated as a hit for the purpose of ProposeDeal processing. A ProposeDeal message carries the authority to match (and re-match if necessary) the hit from the broker-owner of the hit. However, there is no authority to match the quote from the broker-owner of the quote yet. The main purpose of ProposeDeal message is to get permission from the broker-owner of the quote to commit the deal. ProposeDeal also generates a MarketUpdate message that is broadcasted to all brokers in the network in order to inform then that some amount of the quote should be reserved.

Message Attributes

A new proposed deal containing at least the following attributes:
Reference to a quote that was matched;
Hit (possibly obtain from a quote-to-hit conversion) that was matched; and
Amount of the proposed deal.

Distribution Pattern

Targeted distribution with broadcast toward root. The ProposeDeal message originates at the broker who performed the match (or automatch, or re-match), and its final destination is the broker who owns the quote. Broadcast message is MarketUpdate generated by this ProposeDeal.

Interception routing flag is used.

Preconditions

ProposeDeal message with a reference to quote Q may be sent from broker S to broker B only if previously a OrderAvailable message with quote Q was sent from B to S.

Message Processing

As part of the processing of the ProposeDeal message, receiving broker B should do at least the following:
Verify that the quote to which this ProposeDeal refers is know to B. There is only one case when this may not be true, specifically, if B deleted the quote recently in response to a OrderCancelled message. In this case B should reject the deal and set "Canceled quote" flag in ProposeDealFail message;
Verify that the amount of the proposed deal is still available in the quote, according to B's local order book. If this is not so, B should reject the deal (completely or partially, depending on whether there is at least some available amount in this quote);
Memorise this deal (not necessary if the deal was completely rejected);
Attempt to rematch the rejected amount, generating one or several new ProposeDeal messages if rematch is successful;
Forward the ProposeDeal message further, unless it is completely rejected or B is the owner of the quote.
Initiate deal consummation process if B is the owner of the quote. (Normally this process starts with quote confirmation with the workstation).

Outgoing Messages

If B is the broker that is processing ProposeDeal message M, and S is the broker who sent this message to B. The following outgoing messages may be sent by B as a result of processing message M.

1. If broker B does not reject the proposed deal completely (i.e. it approves the deal, or it approves a partial amount of the deal), and B is not the owner of the quote matched in this proposed deal, then the proposed deal message (may be with a reduced amount) is forwarded further. If R is the broker who is the owner of the quote, $M_1$ is the new ProposeDeal message, and $M_2$ the MarketUpdate message generated by $M_1$ then
targetAndBroadcastToRoot ($M_1$, $M_2$, R, S); is executed.
2. If broker B does not reject a proposed deal completely (i.e. it approves at least a partial amount of the deal), and B is the owner of the quote matched in this proposed deal, then a ConfirmOrder message is forwarded to the workstation that entered this order. ConfirmOrder message and $M_2$ is the MarketUpdate message generated by $M_1$, then
targetAndBroadcastToRoot ($M_1$, $M_2$, W, S); is executed.
3. If broker B does not approve the proposed deal completely (i.e. he rejects at least a part of the amount of the deal), then a ProposeDealFail message is sent. If $M_1$ is the new ProposeDealFail message, and I is the broker who initiated this deal, then
targetSend ($M_1$, I); is executed.

A ProposeDealFail message does not generate a MarketUpdate broadcast in this case, because as there was no MarketUpdate broadcast from B connected with this proposed deal, so there is nothing to unwind. However, subsequent legs of a ProposeDealFail message will normally use targeted distribution with a broadcast from root pattern.

4. If a broker B rematches the rejected deal (or part thereof), then one or more new ProposeDeal messages are generated. If $M_1$ is a new ProposeDeal message, $M_2$ is the MarketUpdate message generated by $M_1$, and O is the broker who owns the newly matched quote, then
targetAndBroadcastToRoot ($M_1$, $M_2$, O, null); is executed.
This is done for each new ProposeDeal message.

ProposeDealFail Message

Description

A ProposeDealFail message is sent from a broker who rejected a proposed deal or reduced its amount, to the broker who initiated the deal. The purpose of the message is to inform the deal initiator that the deal failed (may be partially), optionally return the authority to re-match the hit, and rewind market updates generated by the ProposeDeal message.

Message Attributes

Reference to the deal that failed;
Failed amount;
Non-rematched amount;
Boolean flag indicating whether the reason for rejection was cancelled quote.
("Cancelled quote" flag).

Example

Consider an original deal amount of 100, of which only 70 was approved by the broker that generated this ProposeDealFail message. This broker was able to do a re-match for an amount 20. In this case, the failed amount would be 30 and the non-rematched amount would be 10. Such a ProposeDealFail message would carry the authority to perform additional rematch, if possible, for the amount non-rematched amount 10.

Distribution Pattern

Targeted distribution, or Targeted distribution with broadcast from root. Targeted distribution is used by the broker that generated this message, and Targeted distribution with broadcast from root is usually used by subsequent brokers. Side-broadcasted message is MarketUpdate that unwinds the MarketUpdate generated by the original ProposeDeal message, with unwind amount equals to "Failed amount" of ProposeDealFail message. Interception routing flag is used.

Preconditions

A ProposeDealFail message with a reference to a deal D may be sent from broker S to broker B only if previously a ProposeDeal message with deal D was sent from B to S. One consequence of this is that broker B must know deal D.

The non-rematched amount should be less or equal than the failed amount, and the failed amount should be less or equal than the deal amount of the original proposed deal. The non-rematched amount should be non-negative and the failed amount should be positive.

Message Processing

As part of the processing of the ProposeDealFail message, receiving broker B should do at least the following:
Verify that this deal is known to B, and report an error otherwise.

If the message has "Cancelled quote" flag set, verify that the quote matched in this deal is know to B and marked as cancelled, and report an error otherwise.

Attempt to rematch non-rematched amount of the deal, generating one or several new ProposeDeal messages if rematch is successful.

Forward ProposeDealFail message further (possibly with a reduced non-rematched amount, if B did some rematching), unless B is the initiator of the deal.

Send HitNotMatched message to the owner of the hit, if B is the initiator of the deal but not the owner of the hit, and remaining non-rematched amount is not zero.

If the fate of this proposed deal is now completely known, the sum of failed amounts or all ProposeDealFail messages and Done amount of DealDone messages for this deal being equal to the deal amount, B does not need to keep information about this deal any longer. Moreover, if the quote is marked as cancelled, and this deal was the last pending deal for this quote known to B, and there are no outstanding ConfirmOrder requests, the latter is possible for the quote owner only, then information about this quote is not needed any longer either.

Outgoing Messages

If B be the broker that is processing ProposeDealFail message M, S is the broker who sent this message to B, and R is the broker who owns the quote matched in the failed deal.

The following messages may be sent by B as a result of processing message M.

1. If a broker B rematches non-rematched amount of a ProposeDealFail message rejected deal (or part thereof), then one or more new ProposeDeal messages are generated. Thus, if $M_1$ is a new ProposeDeal message, $M_2$ is the MarketUpdate message generated by $M_1$, and O is the broker who owns the newly matched quote, then targetAndBroadcastToRoot ($M_1$, $M_2$, O null); is executed. This is done for each new ProposeDeal message.

2. If broker B is not the initiator of deal, and "Cancelled quote" flag is not set, then the ProposeDealFail message (maybe modified) should be forward further. Thus, if I is the broker who initiated this proposed deal, $M_1$ is the new ProposeDealFail message, and $M_2$ the MarketUpdate message generated by $M_1$, then targetAndBroadcastFromRoot ($M_1$, $M_2$, R I); is executed.

3. If broker B is not the initiator of deal, and "Cancelled quote" flag is set, then the ProposeDealFail message (maybe modified) should be forwarded further. However, unlike the previous case, market update for cancelled quote needs not to be broadcasted. Thus, if I is the broker who initiated this proposed deal, and $M_1$ is the new ProposeDealFail message, then
targetSend ($M_1$, I); is executed.

4. If broker B is the initiator of deal D, but not the owner of the hit involved in the deal D, and non-rematched amount is not zero, then HitNotMatched message is sent to the owner of the hit. Thus, of O is the broker who is the owner of the hit, and $M_1$ is the new HitNotMatched message, then
targetSent ($M_1$, O); is executed. Note that a HitNotMatched message is sent with Bypass routing flag, and therefore is not delivered to application on the intermediate nodes.

5. If broker B is the initiator of the deal D and the owner of the hit matched in the deal, and this hit that was obtained via quote-to-hit conversation, then the MarketUpdate message needs to be broadcasted. The purpose of this message is to reverse (maybe partially) the effect of MarketUpdate message that was sent when quote-to-hit conversion was done. Thus, if $M_1$ is the new MarketUpdate message, then broadcast ($M_1$, B); is executed.

MarketUpdate Message

Description

MarketUpdate message is used to inform all brokers in the network about a change in available and reserved amounts of a quote. In most cases, this message originates on a broker who made some dealing decision (i.e. proposed a deal, or rejected a previously proposed deal), and is sent as a second message in one of Targeted distribution with broadcast patterns. There are also some cases when MarketUpdate message is sent by itself.

Message Attributes

Reference to a quote;

Reservation amount (may be positive or negative).

Distribution Pattern

Broadcast distribution pattern, when sent by itself. It may also be sent as a second message in one of the Targeted distribution with Broadcast patterns. The routing flag is Inspection.

Preconditions

A MarketUpdate message may be sent from broker A to broker B only if the OrderAvailable message for the same quote was previously sent from A to B. The root of the broadcast of MarketUpdate message is always the owner of the quote.

Message Processing

As part of the processing of MarketUpdate message, receiving broker B should do at least the following:

Verify that the quote this message refers to is known to the broker.

Add reservation amount to Reserved amount of the quote, and subtract Reservation amount from Available amount of the quote.

Outgoing Messages

None.

HitNotMatched Message

Description

A HitNotMatched message is sent to the broker-owner of the hit in order to inform him that a proposed deal for this hit failed. Unlike the ProposeDealFail message, HitNotMatched is used when market updates made by the proposed deal are already undone and there are no pending deal objects on the intermediate brokers. The only purpose of this message is to notify the broker that the hit was not matched. This message may be sent when the hit was re-matched by a broker who is not the owner of the hit, and the deal subsequently failed. (See outgoing message(3) in ProposeDealFail processing).

Message Attributes

Reference to a hit;

Non-matched amount of the hit.

Distribution Pattern

Targeted distribution pattern. Routing flag is Bypass.

Preconditions

HitNotMatched may be sent from broker A to broker B only if the following is true:

B is the owner of the hit; and

A initiated a re-match for this hit, and this deal subsequently failed (i.e. A received a ProposeDealFail message).

Message Processing

The receiver of a HitNotMatched message is always the owner of the hit. As part of the processing of the HitNotMatched message, receiving broker B should do at least the following:

Verify that the hit this message refers to is owned by B, or is a result of a quote-to-hit conversion, and that B is the owner of the quote.

If the hit in question was the result of a quote-to-hit conversion, then update available and reserved amounts of the quote, broadcast MarketUpdate message for the quote, and attempt to re-match the quote. Otherwise, update the available amount of the hit.

Depending on business rules, subsequent actions may include informing the trader that the hit failed, or attempting to re-match the hit.

Outgoing Messages

If B is the broker that is processing a HitNotMatched message M, the following messages may be sent by B as a result of processing message M.

1. If broker B rematches the non-matched amount of the hit or quote, then one or more new ProposeDeal messages are generated. If $M_1$ is a new ProposeDeal message, $M_1$ is the MarketUpdate message generated by $M_1$, and O the broker who owns the newly matched quote, then targetAndBroadcastToRoot ($M_1$, $M_2$, O, null); is executed. This is done for each new ProposeDeal message.

2. If the hit was obtained via quote-to-hit conversion, then the MarketUpdate message may need to be broadcasted. The purpose of this message is to reverse (maybe partially) the effect of the MarketUpdate message that was sent when quote-to-hit conversion was done. If $M_1$ is the new MarketUpdate message, then broadcast ($M_1$, B); is executed.

Deal Consummation

ConfirmOrder Message

A ConfirmOrder message is sent from a broker to a trader workstation to verify that a quote entered by this trader is still valid, this message is used when business rules require verification with the workstation that the quote is still valid before finalizing a deal.

Message Attributes

Reference to a quote.

Distribution Pattern

Target distribution, or Targeted distribution with broadcast toward to the root. Routing flag does not matter but for consistency it is preferred to use Interception flag.

Preconditions

The originator of ConfirmOrder message should be a broker, and the destination should be a trader workstation directly connected to this broker. ConfirmOrder message may be sent from broker A to workstation W only if previously a SubmitOrder message was sent from W to A.

Message Processing

As part of the processing of the ConfirmOrder message, receiving workstation W should check whether the quote is still valid, and reply to the broker with an OrderConfirmed message.

Outgoing Messages

If W is the workstation that is processing ConfirmOrder message M, an OrderConfirmed message should be sent by W to the requesting broker as a result of processing message M. If $M_1$ is the new OrderConfirmed message, and A is the broker who issued ConfirmOrder request, then targetSend ($M_1$, A); is executed.

OrderConfirm Message

Description

An OrderConfirmed message is sent from a trader workstation to a broker in response to a ConfirmOrder message. This message contains a reply from the workstation whether a given quote is still valid. ConfirmOrder/OrderConfirmed messages are used when business rules require verification with the workstation that the quote is still valid before proceeding with a deal.

Message Attributes

Reference to a quote;

Boolean flag indicating whether the quote is valid.

Distribution Pattern

Targeted distribution pattern. Routing flag does not matter but for consistency it is suggested to use Interception flag.

Preconditions

The originator of an OrderConfirmed message, receiving broker B should do at least the following:

Verify that this quote is known, and report an error otherwise.

If the message indicates that the quote is not valid, then verify that this quote is in the cancelled state, and report an error otherwise.

If the message indications that the quote is not valid, and for the purpose of ConfirmOrder request was to confirm a deal, then initiate deal cancelling process.

If the message indicates that the quote is valid, and the purpose of ConfirmOrder request was to confirm a deal, initiate deal completion process.

If the message indicates that the quote is valid, and the purpose of ConfirmOrder request was to confirm a quote for quote-to-hit conversion, then perform the conversion and propose a deal, if possible.

If this is the final step in deal confirmation (i.e. no other steps where the deal could potentially fail are involved), and the full volume of the quote is now dealt and these deals are confirmed, then the quote should be cancelled.

Outgoing Messages

If B is the broker that is processing OrderConfirmed message M, the following outgoing messages may be sent by B as a result of processing message M:

1. If the quote is not valid, and a ConfirmOrder message was sent as a result of a ProposeDeal message, then a ProposeDealFail message is sent. If $M_1$ is the new ProposeDealFail message, and I is the broker who initiated this deal, then targetSend ($M_1$, I); is executed.

2. If the quote is not valid, and broker B rematched the hit that was originally matched with this quote, then one or more new ProposeDeal messages are generated. If $M_1$ is a new ProposeDeal message, $M_2$ is the MarketUpdate message generated by $M_1$, and O is the broker who owns the newly matched quote, then targetAndBroadcastToRoot ($M_1$, $M_2$, O null); is executed. This is done for each new ProposeDeal message.

3. If the quote is valid, a ConfirmOrder message was sent as a result of ProposeDeal message, and business requirements do not include any additional deal verification steps, i.e. the deal in now finalised, then the broker that proposed the deal needs to be notified via a DealDone message. If $M_1$ is the new DealDone message, and I is the broker who initiated this deal, then targetSend ($M_1$, I); is executed.

4. If the quote is valid, a ConfirmOrder message was sent in order to verify the quote for the purpose of quote-to-hit conversion, and the deal that B wanted to initiate is still possible, then new MarketUpdate and new ProposeDeal messages are generated. If $M_1$ is a new MarketUpdate message that reserves converted amount from a quote that underwent quote-to-hit conversion, $M_2$ is the new ProposeDeal message, $M_3$ is the MarketUpdate message generated by $M_1$, and O is the broker who owns the quote that is matchable with the result of quote-to-hit conversion, then this case,
    broadcast $(M_1, B)$;
    targetAndBroadcastToRoot $(M_2, M_3, O, null)$; is executed.
5. If the full amount of the quote is now dealt, then an OrderCancelled message needs to be broadcasted in order to inform all brokers that they do not need to keep information about this quote any longer. If $M_1$ is the new OrderCancelled message, then
    broadcast $(M_1, B)$; is executed.

DealDone Message
Description
    A DealDone message is sent from a broker who confirmed the deal to the broker who proposed the deal.
Message Attributes
    Reference to a deal;
    Done amount (may be less than the amount of the original proposed deal).
Distribution Pattern
    Targeted distribution pattern. Routing flag is Inspection.
Preconditions
    DealDone message may be sent from broker A to broker B only if previously a ProposeDeal message with the same deal was sent from B to A.
Message Processing
    As part of the processing of the DealDone message, the receiving broker B should do at least the following:
    Verify that this deal is known, and report an error otherwise.
    If this broker is the originator of the deal, but not the owner of the hit, then send HitMatched message to owner of the hit informing him about the deal.
    If the fate of this deal is now completely known (i.e. sum of Failed amounts of all ProposeDealFail messages and Done amount of all DealDone messages for this deal is equal to the deal amount), then B does not need to keep information about this deal any longer. Moreover, if the quote is marked as cancelled, this deal was the last pending deal for this quote known to B, and there are no outstanding ConfirmOrder requests (the latter is possible for the quote owner only), the information about this quote is not needed any longer either.
Outgoing Messages
    If B is the broker that is processing DealDone message M, the following outgoing messages may be sent by B as a result of processing message M.
    If B is the originator of the deal, but not the owner of the hit, then a HitMatched message should be sent to the owner of the hit. Thus, if $M_1$ is the new HitMatched message, and O is the broker who owns the hit (or the quote that produced this hit if the hit is the result of quote-to-hit conversion), then
    targetSend $(M_1, O)$; is executed.

HitMatched Messages
Description
    A HitMatched message is sent from a broker who proposed a deal to the broker who owns the hit, in order to inform him that the hit is matched, and provide the details of the deal.
Message Attributes
    Reference to a quote that was matched;
    Reference to a hit that was matched;
    Matched amount.
Distribution Pattern
    Targeted distribution pattern. Routing flag is Bypass.
Preconditions
    HitMatched message may be sent from broker A to broker B only if all of the following is true:
    B is the owner of the hit matched in the deal (or the owner of the quote that generated this hit through quote-to-hit conversion);
    A proposed this deal, and the deal was confirmed.
Message Processing
    As part of the processing of the HitMatched message, receiving broker B should do at least the following:
    Verify that this hit matched in the deal is owned by B, and report an error otherwise.
    Adjust "reserved" and "done" amounts of the hit, and inform the trader about the deal.
Outgoing Messages
    None Various modifications and alternate configurations to those described are possible and will occur to those skilled in the art whilst being within the scope of the invention which is defined by the following claims.

What is claimed is:

1. An anonymous trading system for trading fungible instruments comprising:
    a communications network for transmitting electronic messages;
    a plurality of order input devices connected to the communications network each for generating electronic price quotation messages including bid and/or offer prices and for communication to a trader of price quotation messages received from others of said plurality of order input devices over the network;
    a plurality of broking nodes connected to the network, the broking nodes each being configured to match orders input into the system from the order input devices, execute deals where orders are matched, and distribute price quotation messages to the order input devices in response to the price quotation messages and the order matching;
    wherein the broking nodes are arranged as a plurality of cliques, wherein each clique comprises a plurality of logically connected broking nodes, with each broking node in a clique being connected to all other broking nodes in the clique and any two cliques are connected by a single path, whereby the plurality of broking nodes form a clique tree.

2. An anonymous trading system for trading fungible instruments comprising:
    a communications network for transmitting electronic messages;
    a plurality of order input devices connected to the communications network each for generating electronic price quotation messages including bid and/or offer prices and for communication to a trader of price quotation messages received from others of said plurality of order input devices over the network;
    a plurality of broking nodes connected to the network, the broking nodes each being configured to distribute price quotation messages to the order input devices in response to the price quotation messages and order matching;
    wherein the broking nodes are arranged as a plurality of cliques, wherein each clique comprises a plurality of logically connected broking nodes, with each broking node in a clique being connected to all other broking nodes in the clique and any two cliques are connected by a single path, whereby the plurality of broking nodes form a clique tree.

3. An anonymous trading system according to claim 2, wherein messages transmitted on the network include routing information.

4. An anonymous trading system according to claim 3, wherein the routing information includes a distribution pattern.

5. An anonymous trading system according to claim 3, wherein the routing information includes a node specified in a message send request.

6. An anonymous trading system according to claim 3, wherein the routing information includes a routing flag.

7. An anonymous trading system according to claim 4, wherein the distribution pattern is a targeted pattern in which a message is sent to a specified destination node.

8. An anonymous trading system according to claim 4, wherein the distribution pattern is a broadcast pattern in which a message is to be sent to a node in the network.

9. An anonymous trading system according to claim 4, wherein the distribution pattern is a broadcast with exclusion in which a message is to be sent to all nodes in a network except a given node or set of nodes.

10. An anonymous trading system according to claim 7, wherein the distribution pattern is a complex pattern comprising two or more of said targeted pattern, said broadcast pattern and said broadcast with exclusion pattern.

11. An anonymous trading system according to claim 6, wherein the routing flags include a bypass flag indicating that message is to be delivered only to its final destination.

12. An anonymous trading system according to claim 6, wherein the routing flag includes an inspection flag indicating that the message is to be delivered to each node on the path from the message source to the message destination.

13. An anonymous trading system according to claim 6, wherein the routing flag includes an interception flag indicating that the message is to be delivered only to the first node on the path from the source node to the destination.

14. An anonymous trading system according to claim 2, wherein deal related information messages distributed on the communications network include a SubmitOrder message sent from an order input device to a node, and the deal related information is an indication that a new order is entered into the system.

15. An anonymous trading system according to claim 14, wherein the deal related information messages include an OrderAvailable message indicating that a new order has been submitted from an order input device, the OrderAvailable message being received at a network node to which the submitting order input device is connected and broadcast through the network.

16. An anonymous trading system according to claim 15, wherein the deal related information messages include an OrderCancelled message sent from an order input device to a node, and the deal related information is an indication that an order is no longer available.

17. An anonymous trading system according to claim 16, wherein the deal related information messages include an interrupt order message broadcast through the network on receipt of an order cancelled message.

18. An anonymous trading system according to claim 17, wherein the deal related information messages include a ProposeDeal message sent from a node at which an order is matched and the deal related information is an indication that a deal between two orders is proposed.

19. An anonymous trading system according to claim 2, wherein a deal related information message distributed on the communications network is a market update message broadcast to a node and the deal related information is a change in available and reserved amounts of an order.

20. An anonymous trading system according to claim 18, wherein the deal related information messages include a proposed deal fail message sent by a node owning one side of a proposed deal and the deal related information is a rejection or partial rejection of the deal.

21. An anonymous trading system according to claim 2, wherein a deal related information message distributed on the communications network is a HitNotMatched message sent by a node to whom a hit order is submitted and the deal related information is an indication that the deal proposed for the hit order failed.

22. An anonymous trading system according to claim 2, wherein a deal related information message distributed on the communications network is a ConfirmOrder message sent by a node to an order input device and the deal related information is whether an order entered from the order input device is still valid.

23. An anonymous trading system according to claim 22, wherein the deal related information message is an OrderConfirmed message sent from the order input device to the node in response to a ConfirmOrder message and the deal related information is still valid.

24. An anonymous trading system according to claim 2, wherein a deal related information message distributed on the communications network is a deal done message sent from a node confirming a deal to a node proposing a deal, and the deal related information is that a proposed deal has been done.

25. An anonymous trading system according to claim 2, wherein a deal related information message distributed on the communications network is a list matched message sent from a node proposing a deal and the deal related information is that a hit order has been matched.

26. An anonymous trading system according to claim 2, wherein the broker nodes each comprise a store of orders available for trading in the system.

27. An anonymous trading system according to claim 2, wherein the single path connecting two cliques comprises a broker node common to both cliques.

28. An anonymous trading system according to claim 2, wherein the fungible instruments are financial instruments.

* * * * *